3,435,151
ARRANGEMENT OF BRANCHED TELEPHONE SUBSETS

Percy Arthur Russell, San Isidro, Buenos Aires, Argentina, assignor to International Standard Electric Corporation, New York, N.Y., a corporation of Delaware Filed Dec. 28, 1965, Ser. No. 516,881
Int. Cl. H04m 1/70, 3/58
U.S. Cl. 179—27 9 Claims

ABSTRACT OF THE DISCLOSURE

An arrangement is provided for two branched telephone subsets to enable either subset to directly connect to the other, to transfer calls to the other and to make external calls independently of each other. The system also assures secrecy of incoming and outgoing calls and prevents the other subset from breaking into existing calls by itself.

This invention refers to an arrangement of branched telephone subsets, and more particularly to an arrangement of branched telephone subsets adapted to provide useful additions to standard telephone apparatus without causing adverse changes of importance.

A known problem in the telephone art is that of providing two telephone subsets with the service known as "branched subsets." A typical example is the subsets of an executive and his secretary. An incoming call may be taken by anyone on either set. Once it is taken, the other set cannot, in general, get mixed into the talk, unless a certain move is made by means of a lever, etc. Similarly, one of the sets may ask for a call which is later transferred to the other set, and it is also possible for the two sets to operate in parallel, so that the secretary can take notes from the talk; she can furnish certain information; etc. The best situation would be that, in addition, an incoming call could be retained while an inquiry is made between the two sets, the outside party not being aware of the talk between the two extension subsets.

The prior art arrangements that were adapted to provide these and other facilities were, generally speaking, rather complicated and expensive. Besides, it was necessary to have a relay box of appreciable dimensions; all of which is highly detrimental to the aesthetics of the usual office.

In accordance with this invention there is provided an arrangement of branched telephone subsets comprising two telephone subsets. Each of the subsets is provided with a momentary local call switch and a momentary outside call switch. The local call switch of each of the subsets is placed in the driving circuit of a local connection relay of the same subset including a circuit for holding over one of its own contacts and a make contact of the cradle switch. The local connection relay is provided with a contact for connection of its own subset on a power supply and a contact for parallel connection with the other subset. For each subset an outside call relay is provided which driving circuit is interposed said outside call pushbutton. The outside connection relay includes a holding circuit including one of its own contacts and a make contact of the cradle switch of the same subset. The driving circuit for said outside connection relay of each subset includes the parallel arrangement of a make contact of the local connection relay of the other subset and a back contact of the outside connection relay of the other subset, besides including in series with the driving circuit a make contact of its own cradle switch.

It is, therefore, one of the objects of this invention to provide an arrangement of branched telephone subsets comprising a pair of exactly alike telephone subsets which are connected with an auxiliary box containing the branching arrangement through a simple plug and socket.

Another object of this invention is to provide an arrangement of branched telephone subsets wherein a few relays contained in a box are operated by power supply from the electric mains.

Another object of this invention is to provide an arrangement of the above type in which, on the occurrence of an interruption in the mains, the telephone line is connected directly to one or both telephone subsets.

Another object of this invention is to provide an arrangement of branched telephone subsets in which, when there is an interruption in the mains while talking through one of the subsets, the call is not lost even though the connection with the mains is re-established.

Another object of this invention is to provide an arrangement of the above type in which the bells of both subsets can be simultaneously rung, or either one of the bells may be separately rung at will.

Another object of this invention is to provide an arrangement of the above type in which the incoming and outgoing calls are completely secret, and the other subset cannot enter the calls by itself.

Another object of this invention is to provide an arrangement of the above type in which the calls may be transferred from one of the subsets to the other without limitation.

Another object of this invention is to provide an arrangement of branched telephone subsets in which one of the subsets can be invited from the other to be connected in parallel on an outside call.

Another object of this invention is to provide an arrangement as disclosed in which an inquiry, may be had with the party who is at the other side, while an outside call is retained at the first subset.

Another object of this invention is to provide an arrangement of branched telephone subsets enabling the local communication between both local subsets without losing the incoming calls.

Another object of this invention is to provide an arrangement of branched telephone, subsets which is adapted to an exchange of acoustical signals between both subsets without lifting the handset of any one of them.

Another object of this invention is to provide an arrangement of branched telephone subsets which is easily adapted to party lines, the call being in this case received at the assigned subset.

Another object of this invention is to provide visual signalling means of the switching between subsets and of the busy line condition.

Figure 1:
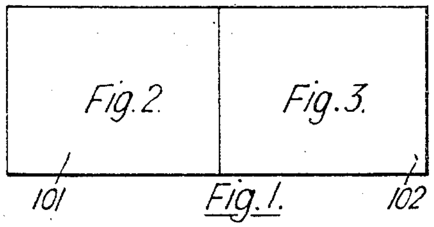
FIG. 1 shows the arrangement of FIGS. 2 and 3 of the enclosed drawings that enables one to understand the complete schematic of the arrangement of this invention.

Now referring more particularly to FIG. 1 of the enclosed drawings, that figure shows how the other two figures should be arranged to form the complete schematic of the preferred embodiment of the arrangement in accordance with this invention. Said schematic drawing may be obtained by arranging FIG. 2 of the enclosed drawings as shown by rectangle 101, and FIG. 3 as shown by rectangle 102.

In all figures arrowheads have been used to show a connection with a DC supply of the appropriate voltage, the "ground symbol" has been used to show a ground or earth connection, and a point with reference CA has been used to show a connection with an AC supply of the appropriate voltage. All this will be explained more fully in the following paragraphs.

Following standard telephone practice, relay windings have been shown as rectangles with capital letters, and the respective contacts have been shown by the same capital letters followed by numbers. The contacts are positioned at the most convenient place in the circuit, without regard to the position or proximity of the respective driving winding.

The contacts are shown in their rest positions; that is, in the positions that they take when the relay winding is not excited.

In reference to the drawings, two telephone subsets of the monophone type which are of an entirely standard construction have been shown including microphones, bells, receivers, cradle switches, induction coils and all standard parts. In addition, each one of the subsets has a switch. These switches have received the references XS and YS, respectively. These switches are used to cut out the bell from the circuit to provide the effect that will be explained below.

The connections with telephone subset X are carried into a number of terminals X1 to X10, while the connections of subset Y are taken to another group of terminals Y1 to Y10.

In the arrangement in accordance with this invention, a couple of pushbutton switches XB and XL are added to telephone subset X. Also two pilot lamps XBA and XLA are provided.

Subset Y is provided with pushbutton switches YA and YL and respectively the pilot lamps YAA and YLA.

Pushbutton switch XB is connected between the earth connection and one of the terminals of the driving winding of a relay A the other terminal of which is connected to a DC power supply which is symbolized by an arrowhead as explained above. This relay A includes its own holding circuit having a resistor RA connected to a DC power supply in series with a holding winding, contact A1 and one of the cradle switch contacts of subset X to earth. A second contact A2 of relay A is connected between the AC power supply and one terminal of the pilot lamp YAA of the other subset, the remaining terminal of said lamp being also grounded. A third contact A3 of relay A is placed in the driving circuit of relay D as explained below. Contact A4 (FIG. 3) is a changeover contact which enables alternatively to connect terminal X10 of subset X to earth or to one of the ends of resistor R8 and contact B5. Contact A5 (FIG. 3) is a make contact connecting the other end of resistor R8 to a main contact of change-over contact B6 of relay B. Contact A6 (FIG. 3) is a changeover contact which is adapted to connect terminal X9 of telephone subset X either with one end of resistor R8 or to line wire *a* through B6.

Figure 2:
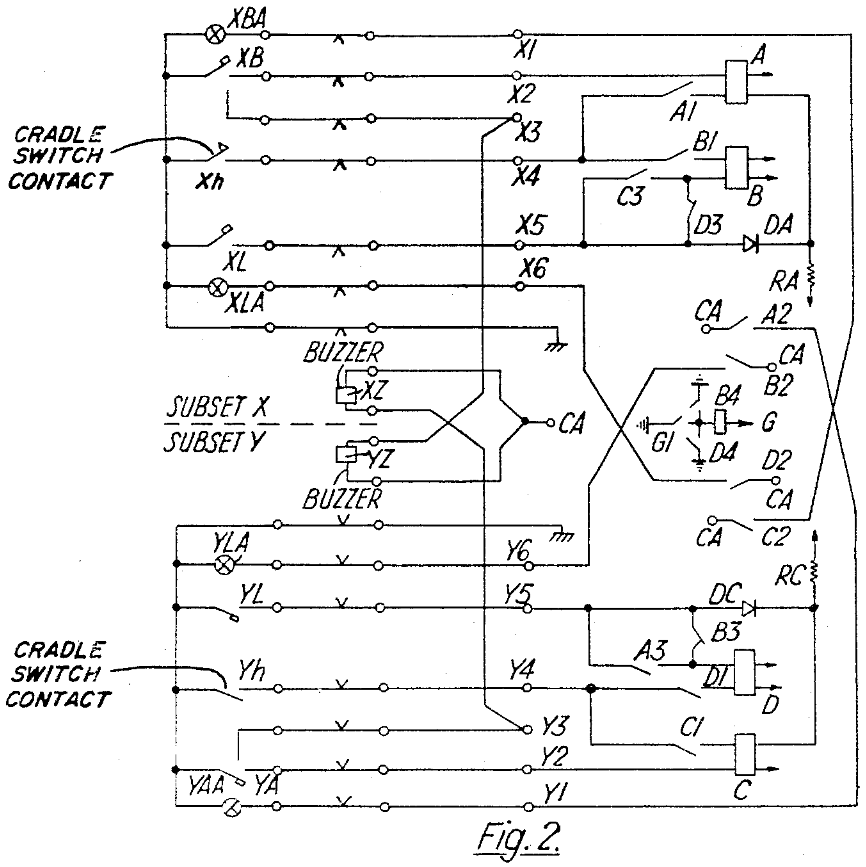
FIG. 2 shows that part of the schematic drawing of the arrangement of this invention that substantially belongs to the relay driving circuits.

The outside connection relay B includes in its driving circuit the make contact C3 of relay C of the local connection of the other subset Y in parallel with make contact D3 of the outside connection relay of subset Y. Besides, this circuit includes the outside connection pushbutton XL, as shown in FIG. 2 of the enclosed drawings. Relay B holds on its own contact B1 in series with a make contact of the cradle switch of subset X.

A contact B2 of the outside connection relay B is connected into the circuit of the busy line interruptor lamp assigned to external line YLA in subset Y. A third break contact B3 is connected in parallel with contact A3 in the driving circuit of the outside line connection relay of subset Y. A make contact B4 of the outside connection relay B connects to earth the driving circuit of the safety relay G. The changeover contact B5 (FIG. 3) of relay B is used to connect the outside line *b* selectively through condenser CL with a winding of transformer T or to the terminal of resistor R8 that is connected to the break contact of changeover contact A4. While the contact B6 is provided to connect line wire *a* selectively to the bell of subset Y through terminal Y8 or to the break contact A6 or break contact A5, the function of which will be explained below.

Safety relay G is provided to avoid the ill-effects of mains failures and it is driven by a part of the mains fed DC power supply. It has three possible earth connections through contacts B4, as mentioned above, D4, as will be explained below, and a self holding contact G1, so that this relay is held while the apparatus is connected to the mains, even for an indefinite period of time. Relay G is provided with break contacts G2, G3, G4, G5 connecting line wires *a* and *b* directly with the talking circuits of telephone subsets X and Y. A further break contact G6 (FIG. 3) connects line wire *b* to the return terminals X7 and Y7 of subsets X and Y respectively.

It should be noted that both subsets are provided with auxiliary buzzers XZ and YZ. Buzzer XZ is connected between the AC terminal CA and the contact Y3 of the other subset that is connected to the local connection pushbutton YA, so that buzzer XZ operates when pushbutton YA is depressed.

The resistor RA is connected into the holding circuit of relay A, a diode DA being connected between the pushbutton switch XL and the end of resistor RA that is connected with the holding winding of relay A, to produce the effect that will be explained below.

The above description relates to subset X and it should be understood that exactly the same thing could be said about subset Y. The circuits of both subsets are entirely symmetrical and they operate identically. In this respect, relays A and B correspond to relays C and D, rectifier DA corresponds to rectifier DC, resistor RA corresponds to resistor RC and also switches XB and XL correspond to switches YA and YL, and lamps XEA and XLA correspond to lamps YAA and YLA. Buzzer XZ corresponds to buzzer YZ, while relay G is common to both subsets.

It should also be understood, as above mentioned, that the telephone subsets suffer as their only change the mounting of the instantaneous pushbutton switch, the buzzers and the signal lamps. All relays, rectifiers, etc. are mounted of course in a separate box which is connected through appropriate multiple cables with the telephone subsets of standard construction.

Power is supplied to the branched subsets in accordance with this invention by means of an AC power supply that may be typically of a potential of 4 volts and which is used to supply the buzzers and the signal lamps. This AC power supply will be represented in a preferred embodiment of this invention by a step-down transformer having a primary winding that is connected to the mains.

The DC power supply which is necessary for the relays is obtained by means of a step-down transformer and dry rectifier, said transformer being also fed from the mains.

OPERATION

The operation of the arrangement in accordance with this invention will be explained by considering the different possible cases:

(1) Local call (from subset X to subset Y)

The handset (not shown) of subset X is lifted and the pushbutton XB is depressed to connect buzzer YZ to earth, so that buzzer YZ operates. Relay A is simultaneously connected to earth and it keeps locked over its own contact A1 and, through the changing over of contact A4, connects subset X to earth. The subscriber at subset Y answers by lifting his handset and depressing pushbutton YA to operate relay C which is locked on its own contact C1 and through the changeover contact C4 connects to earth also subset Y while at the same time it completes through C6 the connection with A6, which is already closed, to so complete the talking circuit between both subsets.

It should be noted that an account of the changing-over of contacts A6 and C6, the secondary winding of transformer T is also connected in parallel with both subsets, so that the outside calls coming through line wires *a* and *b* can be heard as an audible hum.

(2) Outgoing call (from subset X)

The handset is lifted and the pushbutton switch XL is depressed to complete the driving circuit for relay B provided contact D3 is closed because relay D is not operated which means that the line is not being used by subset Y. This means that the relay B closes only when the line is not busy. Relay B is locked on its own contact B1 and a make contact X*h* of the cradle switch to connect wires *a* and *b* of the outside line with subset X thanks to the changing over of contacts B5, B6 and through contacts A4 and A6 which are in the rest position in which they appear in the drawings. On the other hand, the make contact B2 completes the circuit for the lamp YLA of the other subset so that there is an indication that the line *a, b* is busy. At the same time, the driving circuit of relay D is opened at B3 to prevent subset Y from taking the line over.

(3) Incoming call (attended by subset X)

The ringing current from the outside line arrives to both subsets over the changing-over contacts D6 and D5. Subset X answers by lifting the handset and depressing pushbutton XL to operate relay B which keeps locked and connects the subset X with the outside line as explained for the case of the outgoing call corresponding to point 2 in the last paragraph. The relay B lights the lamp YLA of the subset Y, giving it a signal that the call has been answered. For the same reasons as explained in the case of the outgoing calls, subset Y has no chance of getting mixed into the talk.

(4) Transfer of an outside call from one subject to the other (from subset X to subset Y)

If subset X after answering an outside call wants to transfer said call to the other subset, the party presses button XB, so that relay A is closed and the closing of make contact A5 holds the outside line on resistance R8, and in this case it must be taken on account that contact A4 opens and contact B5 is already inverted effecting the connection over line conductor *b* because relay B is operated.

If subset Y wants to capture a call, the concerned party depresses button YL, so that relay D operates connecting line conductors *a* and *b* from subset Y to the outside line, as above explained, and lighting lamp XL in subset X, which is a signal that the line has been taken. It is possible in this case to effect this operation, because contact A3 is closed so that the excitation of relay D is possible. The party at subset X hangs on so that the holding circuit of relays A and B is released and both lamps of subset Y are extinguished.

(5) Local call for inquiry while holding the outside call (outside line being held by subset X)

The outside call is being held while a local call to make an inquiry is effected, as described in relation with point 4. So that subset X can take once more the outside line, push button XL is depressed to short circuit relay A through diode DA. The latter relay opens and then connects once again subset X to the outside line and interrupts the holding circuit that goes through resistance RB.

(6) Facility to parallel over the outside line (subset X invites subset Y)

Outside calls are secret, as above mentioned, so that the other subset is excluded. In spite of this, if it is desired to parallel the other subset, for instance when the assistance of the secretary is deemed convenient to take notes or to take part in the conversation, the subset holding the call effects the operation corresponding to a local call as explained in relation with point 4, and invites the other subset to enter the line.

This connection is only possible under this condition on account of contact B3 being shorted by contact A3, so that relay D can be operated. The entrance of subset Y is signalled by the lighting of lamp XL when contact D2 closes, after which at subset X, pushbutton XL is depressed to enable subset X to return to the retained line. In this opportunity, both red lamps keep lighted. In case that the handset of subset Y is hung off, it cannot take the line again, unless it is invited by the other subset; as relay D releases.

(7) Interruption of the bell of one of the subsets (subset X interrupts the bell of subset Y)

The connection of the terminals of the relay box can be so inverted that the magnet of subset Y passes through the switch in subset X.

(8) Party line connection (ringing current through wire *a* to subset X and through wire *b* to subset Y)

Figure 3:
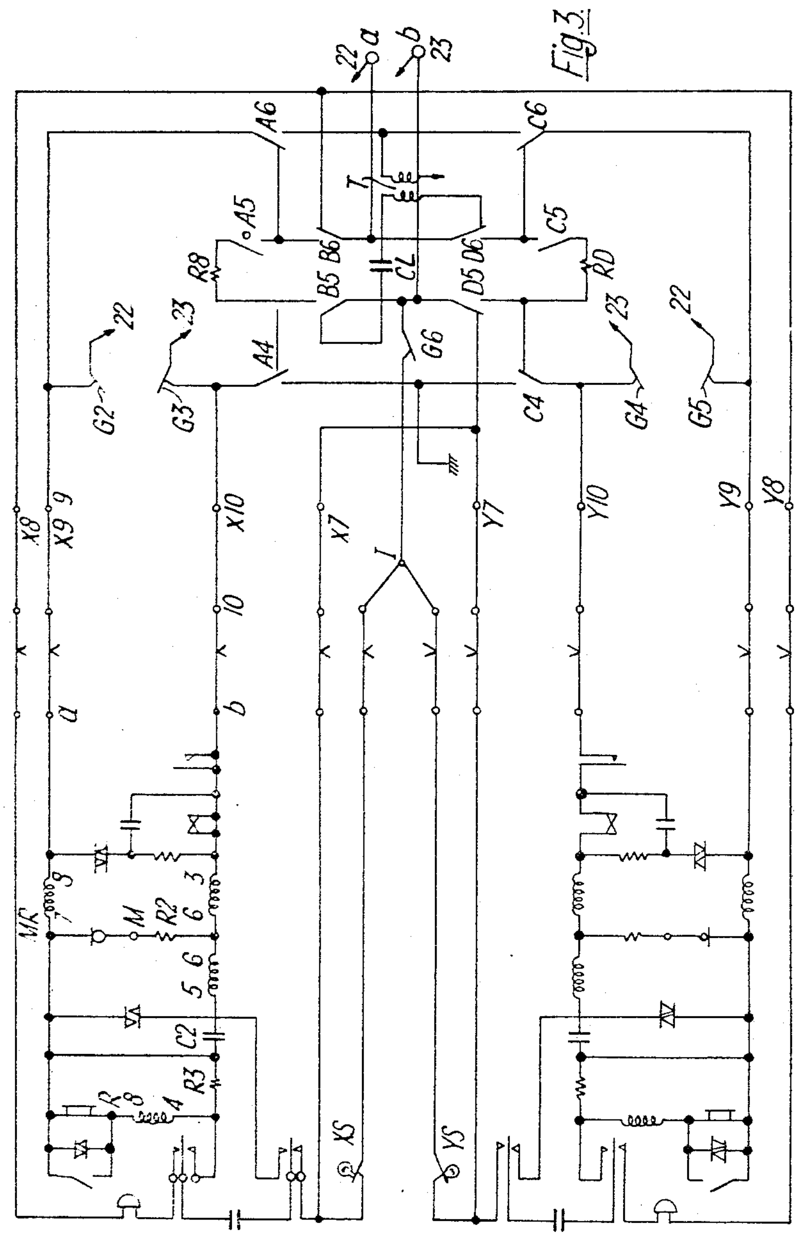
FIG. 3 shows the rest of the arrangement in accordance with this invention, substantially corresponding to the interconnection between sets and to the outside lines.

To get this type of facility it is merely necessary to transfer to earth the wire going to terminal X7 and the wire going to terminal Y8, and to disconnect the two wires which are connected to the terminal Y in FIG. 3 of the enclosed drawings.

(9) Emergency facility for the case of failure of the mains supply

This arrangement includes, as has been mentioned, a relay G, provided with break contacts G2, G3, G4, G5 which through conductors 22 and 23 connect lines wires *a, b* in parallel over both subsets.

Relay G keeps held by its own contact G1, while the mains voltage is on. As soon as this voltage disappears by any reason, the relay opens and both subsets are connected in parallel, so that if one of the parties is talking, he can go on with the call. When the interruption ceases, relay G is not operated unless pushbutton XB or YA is depressed at the subset that is in operation. In this way, the call is not interrupted when the mains voltage reappears.

(10) Facilities at the other subset

It should be understood that both subsets being identical, all the subject matter disclosed in reference with subset X is also valid for subset Y.

While the principles of this invention have been above described in connection with specific apparatus, it is to be clearly understood that this description is made by way of example and not as a limitation on the scope of this invention.

What is claimed is:

1. An arrangement of branched telephone subsets comprising two telephone subsets; each of said subsets including a momentary local call switch, a momentary outside call switch, a cradle switch make contact and a local connection relay; said local call switch of each of said subsets being placed in the driving circuit of said local connection relay of the same subset including a circuit for holding over one of its own contacts and a cradle switch make contact; said local connection relay having a contact for connection of its own subset on a power supply and a contact for parallel connection with the other subset; each subset including an outside call relay in which a driving circuit is interposed by operation of an outside call pushbutton; said outside call relay including a holding circuit incorporating one of its own contacts and a cradle switch make contact of the same subset; and the driving circuit for said outside call relay of each subset including the parallel arrangement of a make contact of the local connection relay of the other subset and a back contact of the outside connection relay of the other subset, besides including in series with the driving circuit a cradle switch make contact.

2. An arrangement of branched telephone subsets in accordance with claim 1, in which said momentary local call switch includes a contact connected in series with a buzzer provided in the other subset.

3. An arrangement of branched telephone subsets in accordance with claim 1 in which the power supply is a DC power supply and said driving circuit for said outside connection relay includes a resistor having a first end connected in series with said power supply and a rectifier connected between a second end of said resistor and a make contact connected to earth through a cradle switch make contact.

4. An arrangement of branched telephone subsets in accordance with claim 1, in which said power supply includes a safety device comprising a relay which is excited by said power supply with a self-holding contact, said relay being provided with break contacts for connecting the outside line with said two telephone subsets.

5. An arrangement of branched telephone subsets in accordance with claim 4, in which make contacts of said outside call relays are connected in parallel with said self-holding contact of said safety relay.

6. An arrangement of branched telephone subsets in accordance with claim 1, in which the local connection relays include make contacts which are connected into the circuit of a pilot lamp of the other subset.

7. An arrangement of branched telephone subsets in accordance with claim 1, in which each one of said outside connection relays includes a contact connected into the circuit of a pilot lamp of the other subset.

8. An arrangement of branched telephone subsets in accordance with claim 1, in which each of said outside connection relays includes a changeover contact that in its make position includes contacts for connecting the primary winding of a transformer between the outside line wires, the secondary winding of said transformer being connected to the wire connecting the make contacts of the local connection relays of both subsets that belong to the local connection.

9. An arrangement of branched telephone subsets in accordance with claim 1, in which a series circuit is connected between the outside line wires to provide make contacts between said outside connection relay and a make contact of said local connection relay.

References Cited

UNITED STATES PATENTS

| | | |
|---|---|---|
| 1,893,323 | 1/1933 | Crocker. |
| 2,549,719 | 4/1951 | Stehlik. |

KATHLEEN H. CLAFFY, *Primary Examiner.*

VAN C. WILKS, *Assistant Examiner.*

U.S Cl. X.R.

179—1